Figure 1:
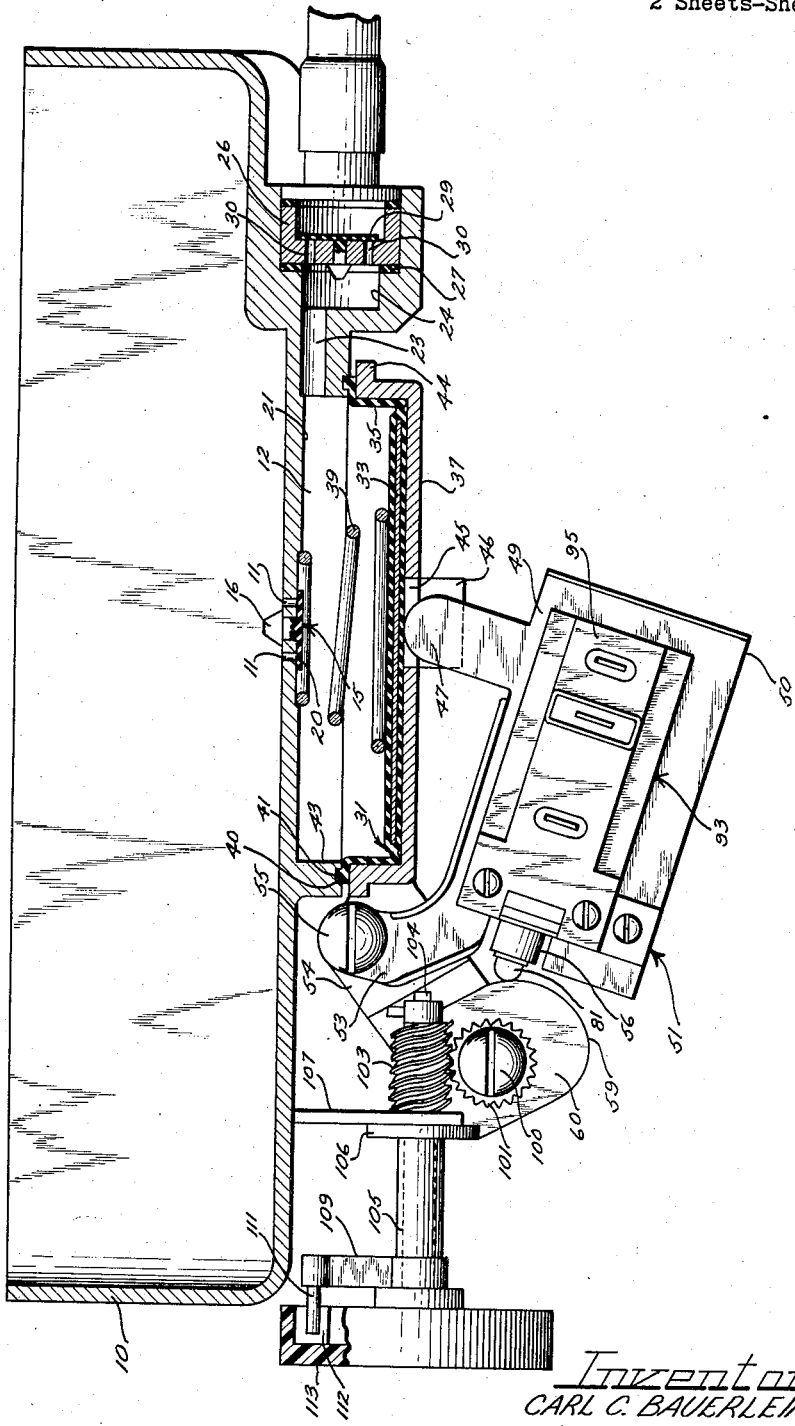

May 26, 1959 C. C. BAUERLEIN 2,888,174
LIQUID MEASURING AND DISPENSING DEVICE
Filed March 11, 1957 2 Sheets-Sheet 1

Inventor
CARL C. BAUERLEIN

May 26, 1959
C. C. BAUERLEIN
2,888,174
LIQUID MEASURING AND DISPENSING DEVICE
Filed March 11, 1957
2 Sheets-Sheet 2
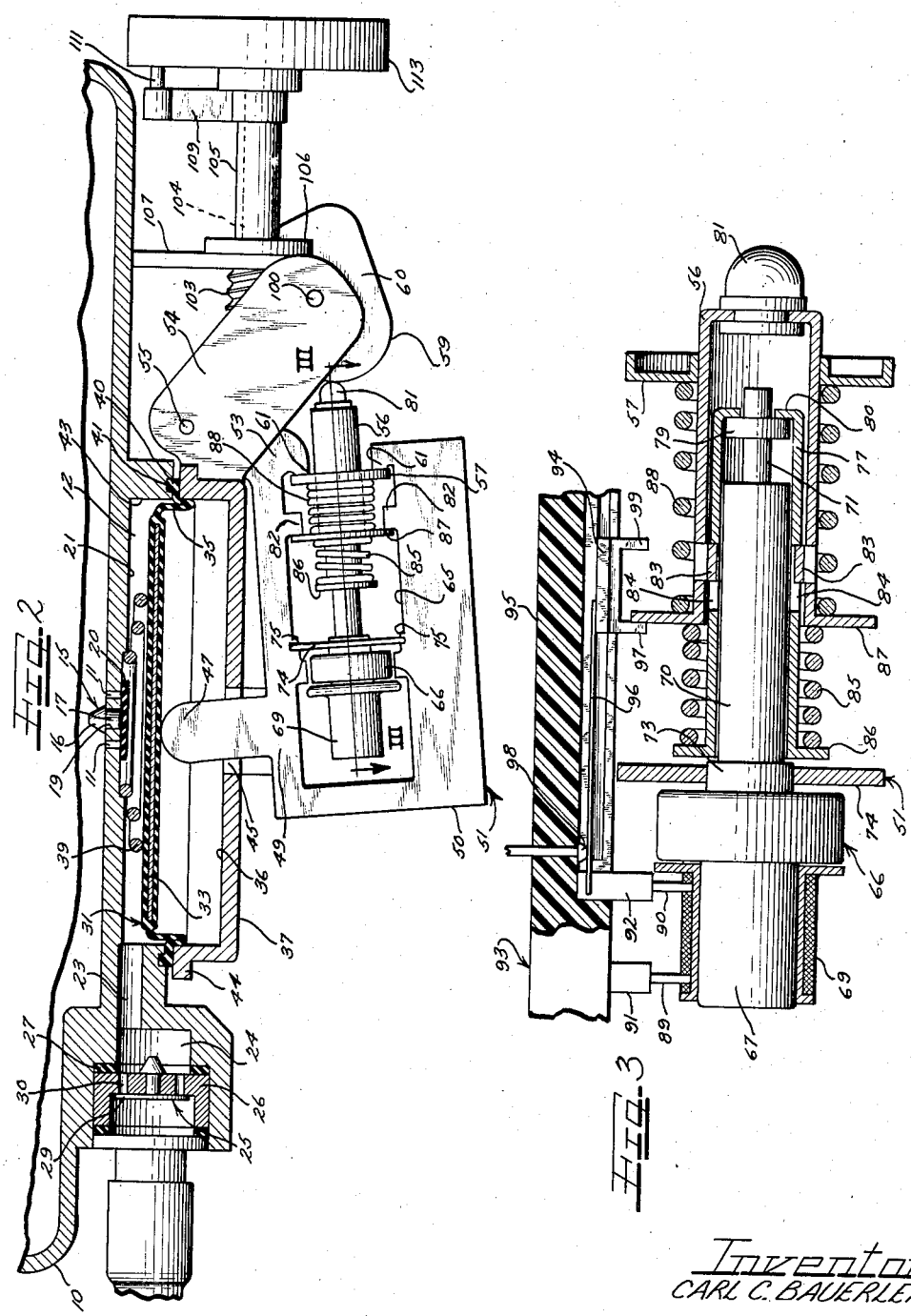
Inventor
CARL C. BAUERLEIN

United States Patent Office 2,888,174
Patented May 26, 1959

2,888,174
LIQUID MEASURING AND DISPENSING DEVICE

Carl C. Bauerlein, Lincolnwood, Ill., assignor to The Dole Valve Company, Chicago, Ill., a corporation of Illinois Application March 11, 1957, Serial No. 645,216

10 Claims. (Cl. 222—212)

This invention relates to liquid measuring and dispensing devices and more particularly relates to such devices in which the amount of liquid dispensed may be changed at the will of the operator.

A principal object of the invention is to provide a novel and improved form of liquid measuring and dispensing device, accurately measuring and dispensing a given volume of liquid and adjustable at the will of the operator to selectively change the volume of liquid to be dispensed.

A further object of the invention is to provide a novel and improved form of liquid measuring and dispensing device having a measuring chamber in which a wall thereof moves along the chamber to draw liquid into the chamber and dispense liquid therefrom and in which the wall is moved along the chamber to force liquid therefrom by operation of a heat motor reacting against an adjustable reacting surface to vary the amount of movement of the wall along the chamber in a dispensing direction.

Still another object of the invention is to provide a liquid measuring and dispensing device having a measuring chamber having a movable wall, movable along the chamber to draw liquid into the chamber and dispense a measured volume of liquid therefrom, in which a movable plunger serves to move the wall along the chamber in a dispensing direction to reduce the volume thereof, in which the extensible power member of a thermal element serves to operate the plunger and in which a selectively adjustable reaction member is provided to react against the power member of the thermal element and vary the stroke of movement of the plunger, as selected.

These and other objects of the invention will appear from time to time as the following specification proceeds and with reference to the accompanying drawing wherein:

Figure 1 is a vertical sectional view taken through a measuring and dispensing device constructed in accordance with the invention;

Figure 2 is a fragmentary sectional view of the device shown in Figure 1, looking at the device from the opposite side thereof than in Figure 1 showing the heat motor at the termination of a dispensing operation with the abutment cam in a different position of adjustment than in Figure 1; and Figure 3 is an enlarged sectional view taken substantially along line III—III of Figure 2 and showing the drive connection from the thermal element of the heat motor for effecting a dispensing operation.

In the embodiment of the invention illustrated in the drawings, I have shown a container 10 for liquid to be measured such as detergents and the like. The container 10 may be mounted within the top of a washing machine or dishwasher and is shown as having a plurality of apertures 11 leading from the bottom thereof, and forming outlets from said container and inlets into a liquid measuring chamber 12, disposed beneath said container.

A check valve 15 is provided to accommodate the admission of liquid into the chamber 12 through the flow apertures 11 and to block the back flow of liquid through said flow apertures. The check valve 15 is shown as being a well known form of resilient check valve which may be made from rubber, an elastomer or the like and as having a head or button 16 on the end of a stem 17 for the check valve, which is pressed through an aperture 19, arranged centrally of the apertures 11. The head 16 engages the top surface of the bottom of the container 10, to retain a disk-like valve surface 20 of the check valve in engagement with a top wall 21 of the chamber 12. The valve surface 20 flexes downwardly to admit liquid into the chamber 12 upon the creation of suction within said chamber and engages the top wall 21 of said chamber upon normal pressure conditions within said chamber and upon the exertion of fluid under pressure on said valve surface during the dispensing operation.

The chamber 12 has an outlet passageway 23 leading therefrom having communication with an enlarged diameter shouldered check valve chamber 24 having a resilient check valve 25 seated therein. The check valve 25 is seated in a retainer 26 sealed to said chamber as by a sealing ring 27, interposed between the upstream side of said retainer and the shoulder of said shouldered check valve chamber. The check valve 25 is also a resilient check valve and has a resilient disk-like valve face 29 closing flow apertures 30 in the retainer 26 upon the creation of suction in the measuring chamber 12 during filling of said chamber, and accommodating the flow of liquid through the flow apertures 30, upon the creation of pressure in the measuring chamber 12, during a measuring and dispensing operation.

The measuring chamber 12 is closed by a flexible diaphragm 31 forming a movable wall portion of said measuring chamber and stiffened by the usual diaphragm plate 33.

The diaphragm 31 has an annular flexible wall portion 35 extending about the diaphragm plate 33, to accommodate movement of the diaphragm to a position close to the top wall 21 of the measuring chamber during a measuring and dispensing operation, and into engagement with a wall 36 of an end cap 37 during the filling operation, effected by the action of a biasing spring 39. The flexible wall portion 35 of the diaphragm 31 terminates into an annular rib 40 having engagement with an annular recess 41 formed in the lower end of an annular wall portion 43 of the chamber 12, depending from the bottom of the container 10. The outer side of the rib 40 is engaged by a flanged portion 44 of the cap 37, sealing the diaphragm 31 to the wall 43.

The cap 37 has a central slot 45 having guide lugs 46 depending therefrom along opposite sides thereof and forming a guide for a plunger 47 and plate 49 of a rocking frame 50 of a heat motor 51. The frame 50 has an arm 53 extending therefrom, pivotally connected to an arm 54 as by a machine screw 55. The arm 54 is shown in Figure 1 as extending from the end cap 37 and as being formed integrally therewith.

The heat motor 51 has an extensible operator 56 having a hemispherical button or follower 81 on the end thereof. The operator 56 is slidably mounted in a flanged retainer ring 57 carried in the frame 50 and guiding said operator to engage the button 81 with a face 59 of a reaction or abutment member in the form of an adjustable cam 60. The cam 60 is mounted on the arm 54 on a stud 100 for adjustable movement about said stud. Extensible movement of the operator 56 will thus rock the frame 50 about the axis of the machine screw or stud 55 in a direction to move the plunger 47 along the slot 45 and retractibly move the diaphragm 31 to expel a predetermined volume of liquid through the outlet 23, dependent upon the travel of the diaphragm 31 toward the wall 21 of the measuring chamber 12.

The flanged retainer ring 57 has interengagement with lugs 61 extending inwardly of an open end portion 63 of said frame, which serve to retain said flanged retainer ring in position in the frame 50, to guide the operator 56 for movement along an open portion 65 of said frame.

The heat motor 51 is shown as comprising the rocking frame 50 and a thermal element 66 carried in the open portion 65 of said frame and having a casing 67 containing a fusible thermally expansible material, heated by a resistor heater 69 encircling said casing. The thermal element 66 is shown as being a high motion power type of thermal element operating on principles similar to those shown and described in the Vernet Patent No. 2,368,181, dated January 30, 1945. The thermal element 66 has a cylinder 70 extending from the casing 67 having a piston 71 extensibly movable from said cylinder upon heating of the thermally expansible material contained within the casing 67.

The cylinder 70 has an enlarged diameter portion 73, which is herein shown as being pressed within a retainer washer 74 carried on lugs 75 extending along the open portion 65 of the frame 50.

The end of the power member or piston 71 is shown as extending through an open end portion of an overtravel slide or sleeve 77, extending along the cylinder 70 and translationally movable therealong upon extensible movement of the power member 71 from the cylinder 70. A collar 79 secured to the piston 71 inwardly of the end thereof abuts an inturned flanged portion 80 of the overtravel sleeve 77, the inner margin of which inturned flanged portion forms the open end portion through which the piston 71 extends.

The operator 56 is shown as being in the form of a sleeve extending along the overtravel sleeve 77 for a portion of the length thereof and as having an inturned outer end having the semispherical follower or drive button 81 on the end thereof. The operator 56 is retained to the overtravel sleeve 77 by the inward pressing and shearing of retaining portions 83 inwardly from the wall thereof within slots 84 extending along the overtravel sleeve 77, and accommodating limited movement of said overtravel sleeve with respect to the operator 56, when the operator 56 reaches the end of its travel, limited by stops 82 extending within the open portion 65 of the frame 50.

An overtravel spring 85 encircles the overtravel sleeve 77 and is interposed between a flange 86 extending outwardly from the inner end thereof, and a flange 87 extending outwardly from the inner end of the operator 56, and biases the inwardly pressed retainer portions 83 of the operator 56 into engagement with the forward ends of the slots 84, as shown in Figure 3. The spring 85 is sufficiently strong to normally act as a solid member and to yield upon overtravel of the piston 71, when the operator 56 is at the extreme end of its travel and the flange 87 is in engagement with the stops 82. A return spring 88 is interposed between the retainer ring 57 and the opposite side of the flange 87 from the overtravel spring 85, and reacts against the retainer ring 57 to return the operator 56 and overtravel sleeve 77 along the cylinder 70, and to therefore return the piston 71 within the cylinder 70, upon deenergization of the resistor heater 69 and cooling of the thermally expansible material carried within the casing 67.

The return spring 39, for the diaphragm 31, is herein shown as being a conical spring and is seated at one end on the wall 21 of the measuring chamber 12 and at its opposite end on the diaphragm 31, and biases the diaphragm 31 in its extended position shown in Figure 1 as well as providing the pressure to cause said diaphragm to follow the plunger 47 as the frame 50 drops by gravity from the position shown in Figure 2 to that shown in Figure 1, and to cause the end of the button 81 to follow the face of the cam 59.

The resistor heater 69, encircling the casing 67 of the thermal element 66, is energized through terminals 89 and 90 having connection with contacts 91 and 92, respectively, of a switch 93. A slide 94 is guided for slidable movement along a block 95 for the switch and has a contact arm 96 connected therewith, having slidable engagement with an energizing contact 98 and completing an energizing circuit through said contact to the contact 91 when in engagement with said contacts. The slide 94 has spaced fingers 97 and 99 engaged by the flange 87 upon extensible and retractible movement of the operator 56. When the operator 56 is in its retracted position shown in Figure 3, the contact arm 96 will engage the contacts 98 and 91 and effect energization of the resistor heater 69, to heat the fusible thermally expansible material within the casing 67 and effect extensible movement of the piston 71 with respect to the cylinder 70. As the flange 87 engages the finger 99, continued movement of said flange effected by continued extensible movement of the piston 71 will disengage the contact arm 96 from the contact 91 and deenergize the resistor heater 69, and accommodate the thermal element to cool and the spring 88 to return the operator 56 and piston 71. As the thermal element cools, the flange 87 will come into engagement with the finger 97 and move the slide 94 and contact arm 96 in a direction to again engage the contacts 98 and 91 and complete an energizing circuit to the resistor heater 69.

It should here be understood that where the dispenser is used to supply a measured quantity of detergent to a washing machine or the like, that an energizing circuit is completed to the switch arm 96 through the cyclic timer of the washing machine, so that the resistor heater 69 is only energized at the required time interval for supplying detergent to the machine, even though the contact arm 96 may be in engagement with the contact 91.

Referring now to the means for adjusting the length of the arc of rocking movement of the frame 50 and the travel of the plunger 47 and, therefore, adjusting the volume of liquid delivered through the outlet 53, the face 59 of the cam is spaced radially from the center of the stud 100 at varying distances to vary the arc of rocking movement of the frame 50 and the travel of the plunger 47 in a dispensing direction, for a uniform length of travel of the operator 56.

The cam 60 is adjustably moved about the axis of the stud 100 by a worm gear 101 rotatably mounted on said stud and suitably secured to the cam 60, to pivot said cam about said stud upon rotatable movement of said worm gear about said stud. The worm gear 101 meshes with and is driven from a worm 103 on a shaft 104. The worm 103 and worm gear 101 may be self-locking to maintain the worm gear 101 and cam 60 in position when the worm 103 is stationary.

The shaft 104 is shown as being journaled in a sleeve 105 having a flange 106 at its inner end, abutting and secured to a bracket 107 depending from the bottom of the container 10. A stop member 109 extends radially outwardly from the outer end of the sleeve 105 and has a pin 111 extending outwardly therefrom, abutting a radial stop 112 formed on the inside of a hand knob 113, secured to the outer end of the shaft 104 for turning said shaft and the worm 103.

A suitable dial (not shown) may be provided to enable the position of the cam 60 with respect to the operator 56 to be readily determined, and to therefore enable the position at which the hand knob 113 may be turned to adjust the cam 60 to effect the delivery of a required amount of detergent to be determined at a glance. As herein shown, the cam 60 is positioned to effect a minimum delivery of detergent through the outlet 23 when the pin 111 is in engagement with one face of the rib 112, and is in position to effect the delivery of a maximum amount of detergent through the outlet 23 when the pin 111 is in engagement with the opposite face of the rib 112.

In initially starting operation of the dispenser, when the container 10 is filled with detergent and the chamber 12 is empty and the diaphragm 31 is in the extended position shown in Figure 1, the resistor heater 69 is first energized to heat the thermal element 66. This will effect extensible movement of the operator 56 and rocking of the frame 50 and movement of the plunger 47 and diaphragm 31 in a direction to expel air from the measuring chamber 12. Upon cooling of the thermal element, the spring 39 will extend the diaphragm to the position shown in Figure 1 and draw detergent into the chamber 12 through the apertures 11 past the check valve 15, filling said measuring chamber with liquid detergent. The dispenser is then in position to dispense a measured volume of detergent through the outlet 23 past the check valve 25 upon again heating the thermal element 66 by energization of the resistor heater 69.

It may be seen from the foregoing that a simple and improved form of adjustable dispenser has been provided particularly adapted for dispensing detergents, but which may be used for dispensing measured volumes of various other liquids, in which the volume of detergent dispensed is changed at the selection of the operator by varying the amount of travel of the diaphragm 31 toward the wall 21 of the measuring chamber.

It may further be seen that this is attained by changing the position of the cam 60 about the stud 100 and, therefore, bringing the face 59 of said cam closer to or farther away from the button 81 on the end of the operator 56 to vary the amount of rocking movement of the frame 50 and the stroke of the operator 56 for a uniform rate of travel of said operator.

While I have herein shown and described one form in which my invention may be embodied, it will be understood that various modifications and variations in the invention may be effected without departing from the spirit and scope of the novel concepts thereof.

I claim as my invention:

1. In a liquid dispensing device, a container for liquid having a measuring chamber associated therewith, a movable wall portion for said measuring chamber sealed thereto, valve means associated with said measuring chamber to control the admission and dispensing of liquid therefrom, means for moving said movable wall portion along said chamber to effect operation of said valve means to dispense liquid from said chamber comprising a heat motor including a movable frame movable toward and from said chamber and having a plunger engageable with said movable wall portion to move said movable wall portion in a direction to dispense liquid therefrom, a thermal element carried by said frame and having an extensible operator, electrically energizable means for heating said thermal element to effect extensible movement of said operator, a reaction member reacting against said operator to effect movement of said plunger in a direction to move said movable wall portion to dispense liquid from said chamber upon extensible movement of said operator, and means for varying the position of said reaction member with respect to said operator to vary the length of stroke of said plunger with respect to said measuring chamber.

2. An adjustable liquid dispensing device constructed in accordance with claim 1 in which the reaction member is a pivoted cam and has a cam face having different radial spacings from the axis of said cam to vary the movement of said heat motor and stroke of said plunger in accordance with the position of the face of said cam with respect to said operator.

3. In a liquid dispensing device, a container for liquid to be dispensed, a measuring chamber in association with said container and having a movable wall portion, valve means associated with said measuring chamber to control the admission of and dispensing of liquid therefrom, a heat motor for effecting movement of said movable wall portion in a direction to restrict said chamber and to thereby effect operation of said valve means to dispense liquid from said chamber, said heat motor comprising a rockable frame having a plunger engageable with said movable wall portion for moving said movable wall portion in a dispensing direction upon rocking movement of said frame toward said movable wall portion, a thermal element carried in said frame having a casing containing a fusible thermally expansible material, a cylinder extending from said casing and a piston extensible from said cylinder upon fusion of the thermally expansible material in said casing, electrically energizable means for heating said casing and fusing the thermally expansible material contained therein, an operator translationally moved by said piston upon extensible movement thereof, and means for varying the arc of rocking movement of said frame and the length of stroke of said plunger and thereby varying the volume of fluid dispensed, comprising a reaction member providing an abutment for said operator and selectively movable to vary the position of said abutment with respect to said operator, and to thereby vary the length of stroke of said plunger.

4. In a liquid dispensing device, a container for liquid to be dispensed, a measuring chamber in association with said container and having a movable wall portion, valve means associated with said measuring chamber to control the admission of and dispensing of liquid therefrom, a heat motor for effecting movement of said movable wall portion in a direction to restrict said chamber and to thereby effect operation of said valve means to dispense liquid from said chamber, said heat motor comprising a rockable frame having a plunger engageable with said movable wall portion for moving said movable wall portion in a dispensing direction upon rocking movement of said frame in one direction, a thermal element carried in said frame having a casing containing a fusible thermally expansible material, a cylinder extending from said casing and a piston extensible from said cylinder upon fusion of the thermally expansible material in said casing, electrically energizable means for heating said casing and fusing the thermally expansible material contained therein, an operator translationally moved by said piston upon extensible movement thereof, a pivoted cam forming an abutment for said operator, and adjustably movable for varying the arc of rocking movement of said frame and the length of stroke of said plunger and thereby varying the volume of fluid dispensed, said cam having a cam face engaged by said operator and varying in radial spaced relation with respect to the axis of said cam, and means selectively operable for pivoting said cam and maintaining said cam in adjusted relation with respect to said operator.

5. In a liquid dispensing device, a container for liquid to be dispensed, a measuring chamber in association with said container having a movable wall portion, valve means associated with said measuring chamber to control the admission into and dispensing of fluid therefrom, a heat motor for effecting movement of said movable wall portion in a direction to restrict said chamber and to thereby effect operation of said valve means to dispense liquid from said chamber, said heat motor comprising a rockable frame having a plunger engageable with said movable wall portion for moving said movable wall portion in a dispensing direction upon rocking movement of said frame, a thermal element carried in said frame having a casing containing a fusible thermally expansible material, a cylinder extending from said casing and a piston extensible from said cylinder upon fusion of the thermally expansible material in said casing, electrically energizable means for heating said casing and fusing the thermally expansible material contained therein, an operator translationally moved by said piston upon extensible movement thereof, a pivoted cam forming an abutment for said operator and adjustably movable for varying the arc of rocking movement of said frame and the length of stroke of said plunger and thereby varying the volume of fluid dispensed, said cam having a cam face varying in radially spaced relation with respect to the axis of said cam, an adjusting knob for positioning said cam in a selected position of adjustment, and a self-locking drive connection from said knob to said cam for retaining said cam in a selected position of adjustment.

6. In a liquid dispensing device, a container for liquid to be dispensed, a measuring chamber in association with said container having a movable wall portion, valve means associated with said measuring chamber to control the admission into and dispensing of fluid therefrom, a heat motor for effecting movement of said movable wall portion in a direction to restrict said chamber and to thereby effect operation of said valve means to dispense liquid from said chamber, said heat motor comprising a rockable frame having a plunger engageable with said movable wall portion for moving said movable wall portion in one direction upon rocking movement of said frame toward said movable wall portion, a thermal element carried in said frame having a casing containing a fusible thermally expansible material, a cylinder extending from said casing and a piston extensible from said cylinder upon fusion of the thermally expansible material in said casing, electrically energizable means for heating said casing and fusing the thermally expansible material contained therein, an operator translationally moved by said piston upon extensible movement thereof, means for varying the arc of rocking movement of said frame and the length of stroke of said plunger and thereby varying the volume of fluid dispensed, comprising a pivoted cam having a cam face varying in radially spaced relation with respect to the axis of said cam and forming an abutment for said operator, an adjusting knob for positioning said cam in a selected position of adjustment, and a self-locking worm and worm gear drive connection from said knob to said cam for adjustably moving said cam, and retaining said cam in a selected position of adjustment.

7. In a liquid measuring and dispensing device, a container for liquid having a measuring chamber in association therewith, an inlet from said container into said chamber, a check valve preventing the passage of liquid from said chamber through said inlet, an outlet from said chamber, a check valve preventing the passage of liquid from said outlet into said chamber, a diaphragm forming a movable wall portion for said chamber and movable towards said inlet to dispense liquid therefrom, and movable away from said inlet to draw liquid into said chamber, spring means for moving said diaphragm way from said inlet to draw liquid into said chamber, a heat motor for moving said diaphragm towards said inlet to dispense liquid through said outlet, and including a frame mounted for movement toward and from said chamber and having a plunger engageable with said diaphragm to move said diaphragm in a dispensing direction, a thermal element for effecting movement of said heat motor and plunger in a dispensing direction upon heating thereof, means for heating said thermal element, and means for varying the length of stroke of said frame and plunger with respect to said chamber, and thereby varying the volume of liquid dispensed through said outlet.

8. In a liquid measuring and dispensing device, a container for liquid having a measuring chamber in association therewith, an inlet from said container into said chamber, a check valve preventing the passage of liquid from said chamber through said inlet, an outlet from said chamber, a check valve preventing the passage of liquid from said outlet into said chamber, a diaphragm forming a movable wall portion for said chamber and movable towards said inlet to dispense liquid therefrom and away from said inlet to draw liquid into said chamber, a heat motor having a frame mounted for movement toward and from said chamber and having a plunger engageable with said diaphragm for moving said diaphragm in a dispensing direction upon movement of said plunger and frame toward said chamber, a thermal element carried by said frame and having an extensible piston, an operator aligned therewith, a yieldable drive connection from said piston to said operator, electrically energizable means for heating said thermal element to effect extensible movement of said piston, abutment means for said operator to effect movement of said frame and plunger toward said chamber upon heating of said thermal element, and means for varying the position of said abutment means with respect to said operator, and thereby varying the travel of said frame and the length of stroke of said plunger and the volume of liquid dispensed through said outlet.

9. In a liquid measuring and dispensing device, a container for liquid having a measuring chamber in association therewith, an inlet from said container into said chamber, a check valve preventing the passage of liquid from said chamber through said inlet, an outlet from said chamber, a check valve preventing the passage of liquid from said outlet into said chamber, a diaphragm forming a movable wall portion for said chamber and movable towards said inlet to dispense liquid therefrom and away from said inlet to draw liquid into said chamber, a heat motor having a frame mounted for movement toward and from said chamber and having a plunger engageable with said diaphragm for moving said diaphragm in a dispensing direction upon movement of said plunger and frame toward said chamber, a thermal element carried by said frame and having an extensible piston, an operator aligned therewith, a yieldable drive connection from said piston to said operator, electrically energizable means for heating said thermal element to effect extensible movement of said piston, abutment means for said operator to effect movement of said frame and plunger toward said chamber upon heating of said thermal element, means for varying the position of said abutment means with respect to said operator, and thereby varying the travel of said frame and the length of stroke of said plunger and the volume of liquid dispensed through said outlet, comprising a cam having a cam face engaged by said operator and having a variable radial spacing from the center of pivotal movement thereof, and self-locking drive means selectively operable to pivot said cam into its selective positions of adjustment to vary the stroke of said plunger and select the volume of liquid to be dispensed through said outlet.

10. In a liquid measuring and dispensing device, a container for liquid having a measuring chamber in association therewith, an inlet from said container into said chamber, a check valve preventing the passage of liquid from said chamber through said inlet, an outlet from said chamber, a check valve preventing the passage of liquid from said outlet into said chamber, a diaphragm forming a movable wall portion for said chamber and movable towards said inlet to dispense liquid therefrom and away from said inlet to draw liquid into said chamber, spring means for moving said diaphragm away from said inlet to draw liquid into said chamber, a rockable heat motor for moving said movable wall portion to dispense liquid through said outlet comprising a rockable frame having a plunger having engagement with said diaphragm, a thermal element carried by said frame and having a casing containing a thermally expansible material, a cylinder extending from said casing and a piston extensible from said cylinder upon heating of the thermally expansible material within said casing, an operator aligned with said piston, a yieldable drive connection from said piston to said operator, electrically energizable means for heating said casing to effect extensible movement of said piston and said operator, a reaction member for said operator, effecting rocking movement of said frame upon extensible movement of said piston, means selectively operable to adjust the position of said reaction member with respect to said operator to vary the arc of rocking movement of said frame and the stroke of said plunger and means for deenergizing said electrically energizable means upon a predetermined length of stroke of said operator.

References Cited in the file of this patent

UNITED STATES PATENTS

| | | |
|---|---|---|
| 2,368,181 | Vernet | Jan. 30, 1945 |
| 2,702,655 | Lopata | Feb. 22, 1955 |
| 2,801,594 | Lewis | Aug. 6, 1957 |